US012571567B2

(12) United States Patent
Qu et al.

(10) Patent No.: US 12,571,567 B2
(45) Date of Patent: Mar. 10, 2026

(54) VERTICAL LOW-TEMPERATURE STORAGE REFRIGERATOR

(71) Applicant: SHANGHAI ORIGINCELL BIOLOGICAL CRYO EQUIPMENT CO., LTD., Shanghai (CN)

(72) Inventors: Jianguo Qu, Shanghai (CN); Yunfeng Xue, Shanghai (CN)

(73) Assignee: SHANGHAI ORIGINCELL BIOLOGICAL CRYO EQUIPMENT CO., LTD., Shanghai (CN)

( * ) Notice: Subject to any disclaimer, the term of this patent is extended or adjusted under 35 U.S.C. 154(b) by 0 days.

(21) Appl. No.: 19/291,674

(22) Filed: Aug. 6, 2025

(65) Prior Publication Data

US 2026/0029169 A1    Jan. 29, 2026

Related U.S. Application Data

(63) Continuation of application No. PCT/CN2025/070480, filed on Jan. 3, 2025.

(30) Foreign Application Priority Data

Jul. 29, 2024    (CN) .......................... 202411021604.4

(51) Int. Cl.
G07F 11/54        (2006.01)
B65G 1/04         (2006.01)
        (Continued)

(52) U.S. Cl.
CPC ................ F25B 9/14 (2013.01); B65G 1/045 (2013.01); B65G 1/1375 (2013.01); F25D 13/06 (2013.01); G07F 11/54 (2013.01)

(58) Field of Classification Search
CPC ...................................................... B65G 1/045
See application file for complete search history.

(56) References Cited

U.S. PATENT DOCUMENTS 5,168,795 A * 12/1992 Okada ................. G07F 17/0078
                                                       99/336
2001/0043031 A1* 11/2001 Gonska .................. G01N 35/04
                                                       312/304
(Continued)

FOREIGN PATENT DOCUMENTS

CN        109399043 A      3/2019
CN        112208942 A      1/2021
        (Continued)

*Primary Examiner* — Gene O Crawford
*Assistant Examiner* — Ayodeji T Ojofeitimi
(74) *Attorney, Agent, or Firm* — Bayramoglu Law Offices LLC

(57)                ABSTRACT

A vertical low-temperature storage refrigerator includes a sample storage chamber and an operation chamber. The operation chamber is arranged laterally adjacent to the sample storage chamber, a roller shutter passage assembly is arranged on the sample storage chamber, and the roller shutter passage assembly is arranged inside the operation chamber. A sample scooping mechanism is arranged inside the operation chamber, and the sample scooping mechanism is configured to store and scoop the corresponding samples in the sample storage chamber. A rolling storage member drives a transfer window to move upward or downward, and the sample scooping mechanism penetrates the transfer window by moving upward or downward to scoop the sample on the basket, which avoids exposure of other samples that do not need to be extracted, and reduces frequent temperature variations. A grasping mechanism, a transfer tank retention zone, and a code scanning mechanism are arranged together.

15 Claims, 10 Drawing Sheets

(51) Int. Cl.
     *B65G 1/137*    (2006.01)
     *F25B 9/14*     (2006.01)
     *F25D 13/06*    (2006.01)

(56) References Cited

U.S. PATENT DOCUMENTS

| | | | | |
|---|---|---|---|---|
| 2004/0213651 A1* | 10/2004 | Malin | G01N 35/028 | |
| | | | | 414/331.05 |
| 2008/0231152 A1* | 9/2008 | Malin | A47B 63/06 | |
| | | | | 414/800 |
| 2009/0175763 A1* | 7/2009 | Malin | G01N 35/0099 | |
| | | | | 422/65 |
| 2009/0188272 A1* | 7/2009 | Cloutier | F25D 25/04 | |
| | | | | 62/378 |
| 2010/0183408 A1* | 7/2010 | Malin | B01L 7/50 | |
| | | | | 414/222.01 |
| 2016/0084564 A1 | 3/2016 | Malin | | |

FOREIGN PATENT DOCUMENTS

| | | | |
|---|---|---|---|
| CN | 113819699 A | 12/2021 |
| CN | 215247291 U | 12/2021 |
| CN | 217520113 U | 9/2022 |
| CN | 218705936 U | 3/2023 |
| CN | 116101602 A | 5/2023 |
| CN | 118687298 A | 9/2024 |
| WO | 2014187128 A1 | 11/2014 |
| WO | 2021169148 A1 | 9/2021 |

\* cited by examiner

A - A

VERTICAL LOW-TEMPERATURE STORAGE REFRIGERATOR

CROSS-REFERENCE TO THE RELATED APPLICATIONS

This application is a continuation application of International Application No. PCT/CN2025/070480, filed on Jan. 3, 2025, which is based upon and claims priority to Chinese Patent Application No. 202411021604.4, filed on Jul. 29, 2024, the entire contents of which are incorporated herein by reference.

TECHNICAL FIELD

The present disclosure relates to the technical field of sample storage, and in particular to a vertical low-temperature storage refrigerator.

BACKGROUND

In the field of biological sample storage, cryogenic storage and retrieval devices are used for low-temperature storage of biological samples such as blood samples, vaccines, bacterial and viral strains, which enables to maintain viability of the samples at low temperatures during storage.

A cryogenic refrigerator disclosed in the Patent Application No. CN202111108166.1 employs a hinged door. For the purpose of sample storage and retrieval, the entire hinged door must be opened normally, resulting in exposure of a cryogenic zone behind the door. Frequent storage and retrieval to objects stored in the cryogenic zone cause temperature variations and adversely affect the objects stored therein. Particularly in the field of biological sample storage, biological samples are highly sensitive to temperature variations, and easily lose viability. Therefore, a vertical low-temperature storage refrigerator of the present disclosure is designed.

SUMMARY

An objective of this section is to summarize some aspects of examples of the present disclosure and briefly introduce some preferred examples. Some simplifications or omissions may be made in this section, the abstract of the specification, and the disclosure title of the present disclosure to avoid blurring the purpose of this section, the abstract of the specification, and the disclosure title, while such simplifications or omissions shall not be construed as limiting the scope of the present disclosure.

In view of the above problems or problems in the prior art, the present disclosure is provided.

Therefore, an objective of the present disclosure is to provide a vertical low-temperature storage refrigerator, and the refrigerator enables sample scooping without the need to open an entire chamber door. Sample storage and retrieval are achieved only by driving a transfer window through a roller shutter to a corresponding basket access port, thereby avoiding exposure of other samples on the basket and improving the viability of the samples stored.

In order to solve the above technical problems, the present disclosure adopts the following technical solution: a vertical low-temperature storage refrigerator, including a sample storage chamber and an operation chamber, where operation chamber is arranged laterally adjacent to the sample storage chamber, and the operation chamber is configured for storage, transfer, and tube picking of the samples in the sample storage chamber; and a roller shutter passage assembly is arranged on the sample storage chamber, and the roller shutter passage assembly is arranged inside the operation chamber; and a sample scooping mechanism is arranged inside the operation chamber, the roller shutter passage assembly and the sample scooping mechanism are allowed to move upward or downward, and the sample scooping mechanism is configured to store and scoop corresponding samples in the sample storage chamber through the roller shutter passage assembly.

As a preferred solution of the vertical low-temperature storage refrigerator of the present disclosure, the roller shutter passage assembly includes a roller shutter and a transfer window opened on the roller shutter; and the roller shutter is configured to drive the transfer window to move upward or downward, and the sample scooping mechanism is configured for storage and retrieval of the samples in the sample storage chamber in a way of penetrating the transfer window.

As a preferred solution of the vertical low-temperature storage refrigerator of the present disclosure, the roller shutter passage assembly further includes a rolling storage member, the rolling storage member is arranged on the roller shutter, and the rolling storage member is configured to drive the roller shutter to move upward or downward and retract the roller shutter.

As a preferred solution of the vertical low-temperature storage refrigerator of the present disclosure, the rolling storage member includes an upper roller shaft and a lower roller shaft; the upper roller shaft is arranged at an upper end of the roller shutter, the lower roller shaft is arranged at a lower end of the roller shutter, the upper roller shaft is configured to drive the roller shutter to move upward for storage, and the lower roller shaft is configured to drive the roller shutter to move downward for storage.

As a preferred solution of the vertical low-temperature storage refrigerator of the present disclosure, a grasping mechanism is further arranged inside the operation chamber, the grasping mechanism rotatably moves upward or downward to grasp a sample, and the grasping mechanism may be butt-jointed with the sample scooping mechanism.

As a preferred solution of the vertical low-temperature storage refrigerator of the present disclosure, the grasping mechanism includes a grasping lifting assembly, a grasping rotating assembly, and a gripper member; and the grasping rotating assembly is arranged on the grasping lifting assembly, the gripper member is arranged on the grasping rotating assembly, the grasping lifting assembly is configured to drive the grasping rotating assembly to move upward or downward, the grasping rotating assembly is configured to drive the gripper member to rotate, and the gripper member is configured to grasp the sample.

As a preferred solution of the vertical low-temperature storage refrigerator of the present disclosure, a transfer tank retention zone is arranged at a side end of the grasping mechanism, a transfer tank may be placed inside the transfer tank retention zone, and the grasping mechanism is configured to grasp the samples in the transfer tank.

As a preferred solution of the vertical low-temperature storage refrigerator of the present disclosure, a tank passage is opened on the operation chamber, the tank passage is arranged on one side of the transfer tank retention zone, a tank operation door is arranged inside the tank passage, and the transfer tank enters the transfer tank retention zone through the tank passage.

As a preferred solution of the vertical low-temperature storage refrigerator of the present disclosure, a code scanning mechanism is further arranged laterally adjacent to the grasping mechanism, and the grasping mechanism is configured to grasp the sample and rotate same onto the code scanning mechanism for code scanning.

As a preferred solution of the vertical low-temperature storage refrigerator of the present disclosure, the sample scooping mechanism includes a sample pick-and-place lifting assembly, a pick-and-place gripper assembly, and a steering support member, where the steering support member is arranged on the sample pick-and-place lifting assembly, the pick-and-place gripper assembly is arranged on the steering support member, the steering support member may slide vertically on the sample pick-and-place lifting assembly, the steering support member turns around the sample pick-and-place lifting assembly, and the pick-and-place gripper assembly is configured to grasp and store the sample at a target position.

As a preferred solution of the vertical low-temperature storage refrigerator of the present disclosure, the pick-and-place gripper assembly includes a primary telescopic member, a secondary limiting and clamping member, and a grasping member, where the secondary limiting and clamping member is arranged on the primary telescopic member, the grasping member is arranged on the secondary limiting and clamping member, the grasping member is configured to scoop the sample, the primary telescopic member is configured to drive the secondary limiting and clamping member and the grasping member to perform telescopic movement, the secondary limiting and clamping member is configured to perform secondary telescopic movement on the primary telescopic member, and the grasping member is configured to perform telescopic movement on the secondary limiting and clamping member.

As a preferred solution of the vertical low-temperature storage refrigerator of the present disclosure, the secondary limiting and clamping member includes a secondary driving member, a support frame, and a limiting bar, where the secondary driving member is configured to drive the support frame to move on the primary telescopic member, and the limiting bar is arranged on an inner side of the support frame, and the limiting bar is configured to press against the grasping member.

As a preferred solution of the vertical low-temperature storage refrigerator of the present disclosure, the grasping member includes a pushing member, a scoop plate gripper, and a tension-adjusting member, where the tension-adjusting member is arranged on an inner side of the scoop plate gripper, the pushing member is connected to the tension-adjusting member, the limiting bar is configured to press against and limit the tension-adjusting member on the scoop plate gripper, and the pushing member is configured to push the tension-adjusting member and the scoop plate gripper to disengage from the limiting bar so as to avoid being pressed and limited.

As a preferred solution of the vertical low-temperature storage refrigerator of the present disclosure, a thermal insulation door is arranged inside the operation chamber, and the thermal insulation door is configured to open and close the roller shutter passage assembly.

As a preferred solution of the vertical low-temperature storage refrigerator of the present disclosure, a basket is arranged inside the sample storage chamber, and the transfer window moves upward or downward to correspondingly match a storage slot on the basket.

As a preferred solution of the vertical low-temperature storage refrigerator of the present disclosure, an observation window and an operation terminal are arranged on the operation chamber, the observation window is configured to observe an internal operating state of the operation chamber, and the operation terminal is configured to issue commands and display an internal state of the sample storage chamber.

The present disclosure has the following beneficial effects: in the present disclosure, the rolling storage member drives the transfer window to move upward or downward, so as to match the corresponding storage slot on the basket in the sample storage chamber, and the sample scooping mechanism penetrates the transfer window by moving upward or downward to scoop the sample on the basket, which avoids exposure of other samples that do not need to be extracted, and reduces the adverse effects on the samples in the sample storage chamber; the grasping mechanism, the transfer tank retention zone, and the code scanning mechanism are arranged together, such that the grasping mechanism facilitates sample grasping, transport and scanning, and only one grasping mechanism is needed to realize the free movement of a plurality of functional areas; and the thermal insulation door is configured to close the roller shutter passage assembly, so as to further insulate the sample storage chamber.

BRIEF DESCRIPTION OF THE DRAWINGS

To describe the technical solutions in the examples of the present disclosure more clearly, the accompanying drawings required for describing the examples are briefly described below. Apparently, the accompanying drawings in the following description show some examples of the present disclosure, and those of ordinary skill in the art may still derive other drawings from these accompanying drawings without creative efforts. The accompanying drawings are detailed below.

Figure 1:
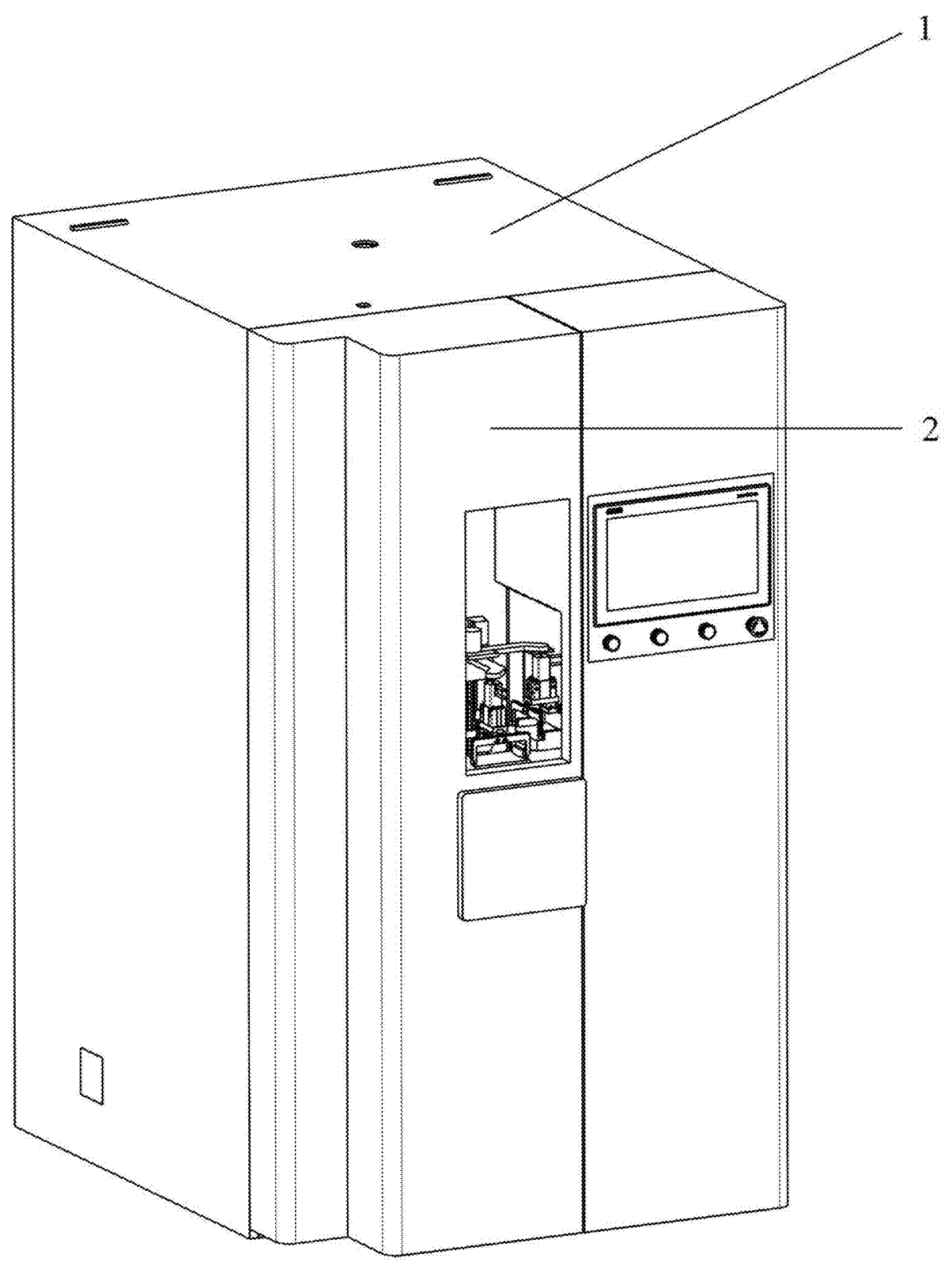
FIG. 1 is a schematic diagram of an overall structure of a vertical low-temperature storage refrigerator of the present disclosure.
Figure 2:
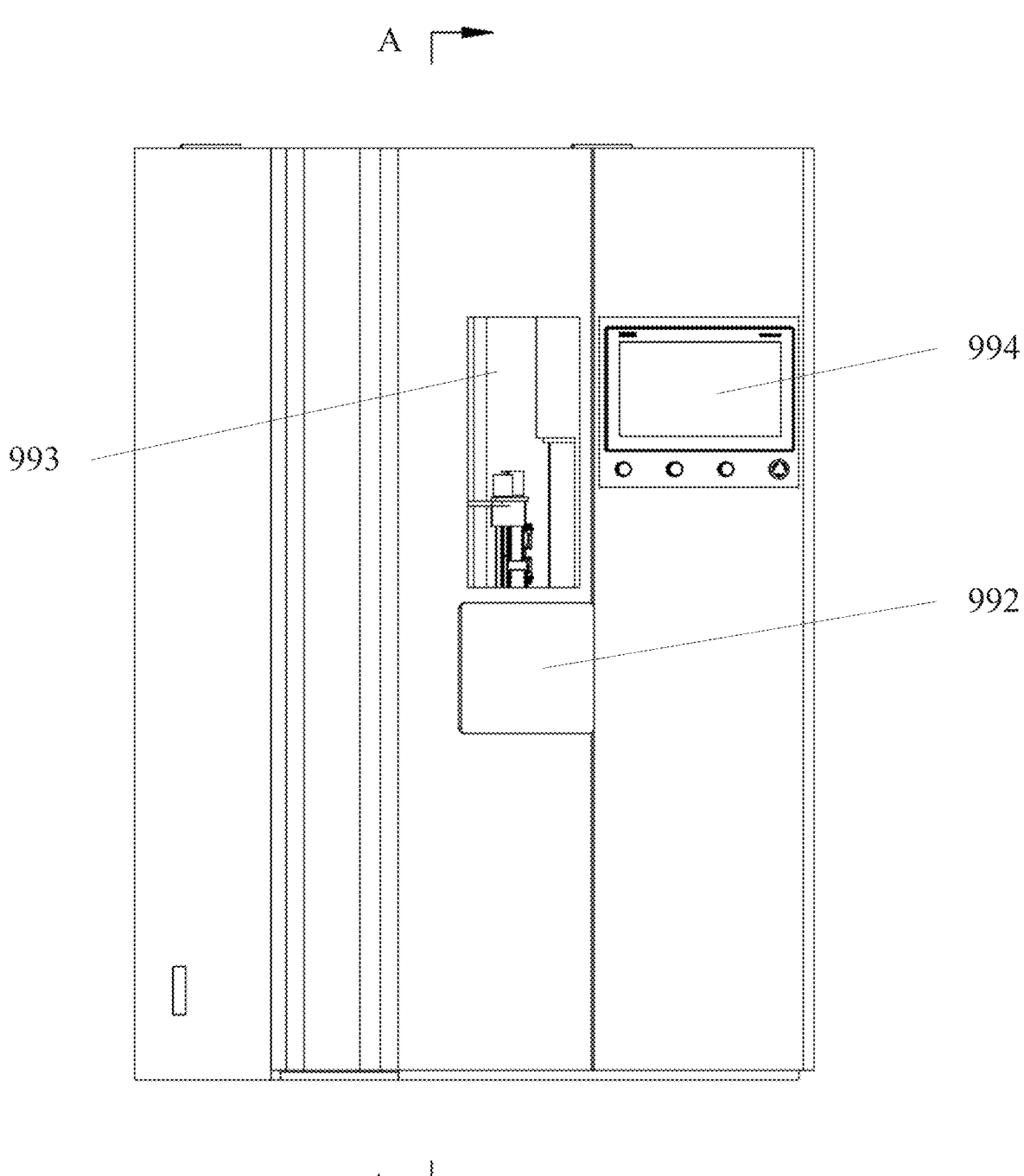
FIG. 2 is a front view of a vertical low-temperature storage refrigerator.
Figure 3:
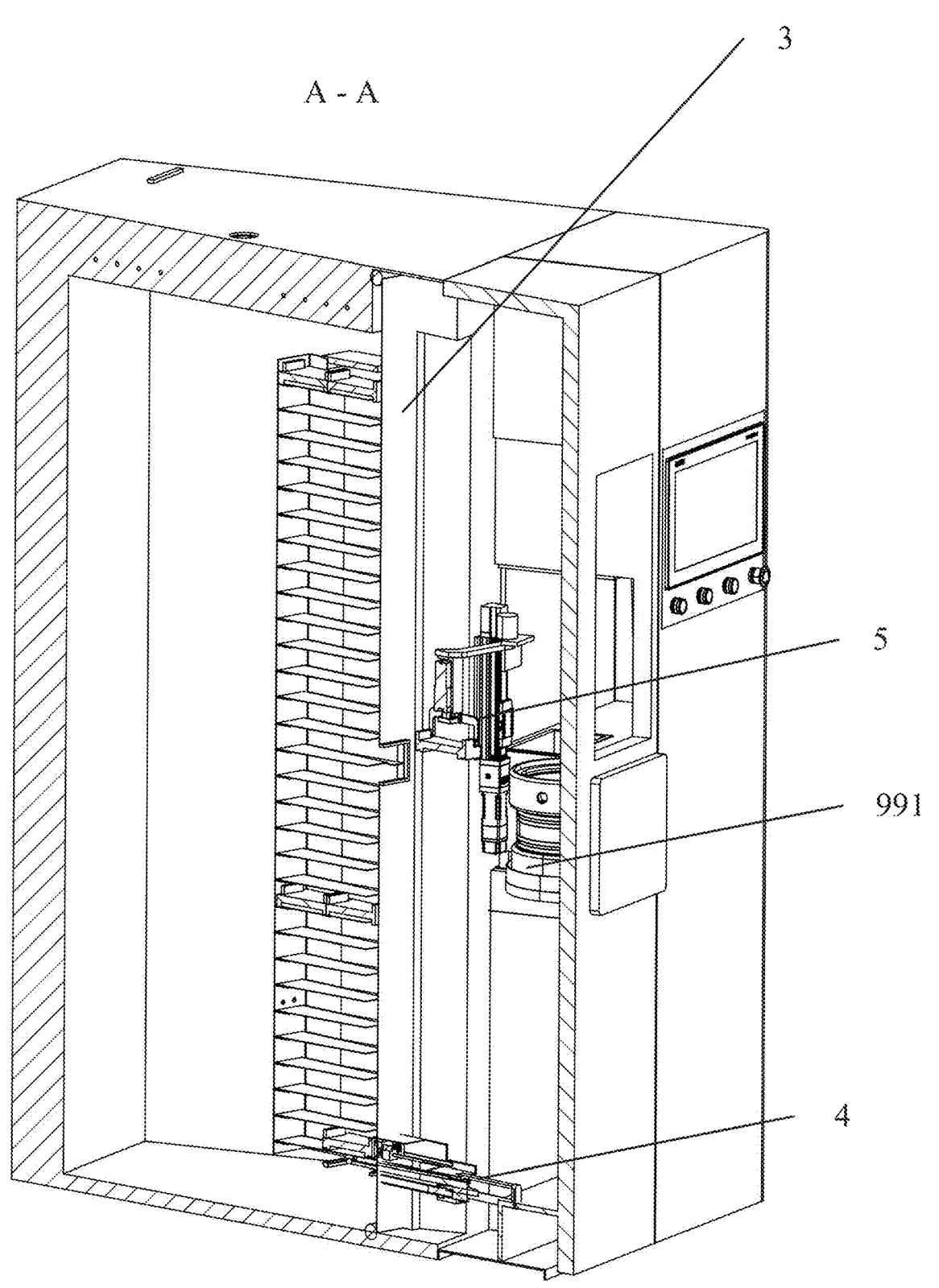
FIG. 3 is a sectional view of the vertical low-temperature storage refrigerator in FIG. 2 in an A-A direction.
Figure 4:
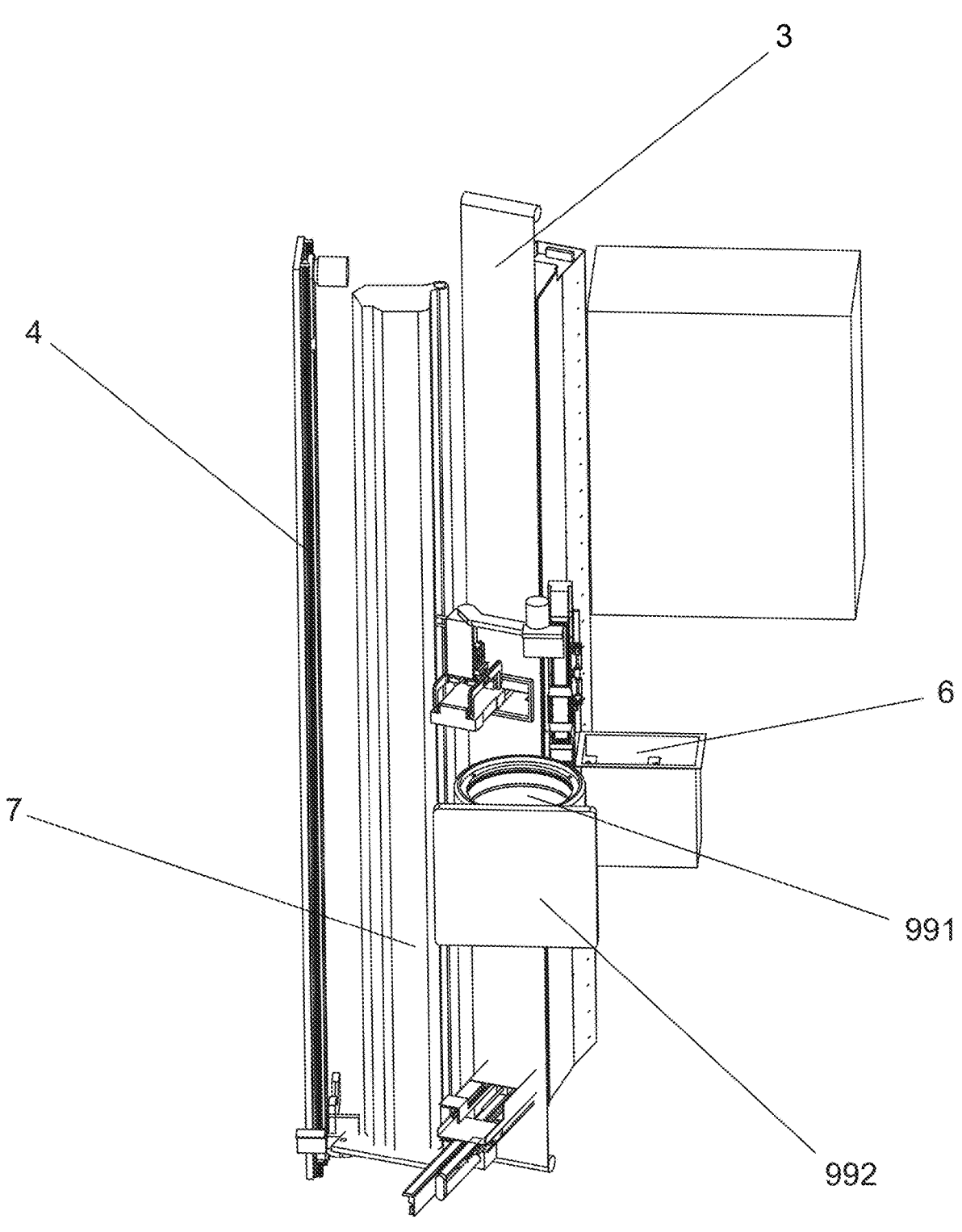
FIG. 4 is a schematic diagram of a sample scooping mechanism of a vertical low-temperature storage refrigerator.
Figure 5:
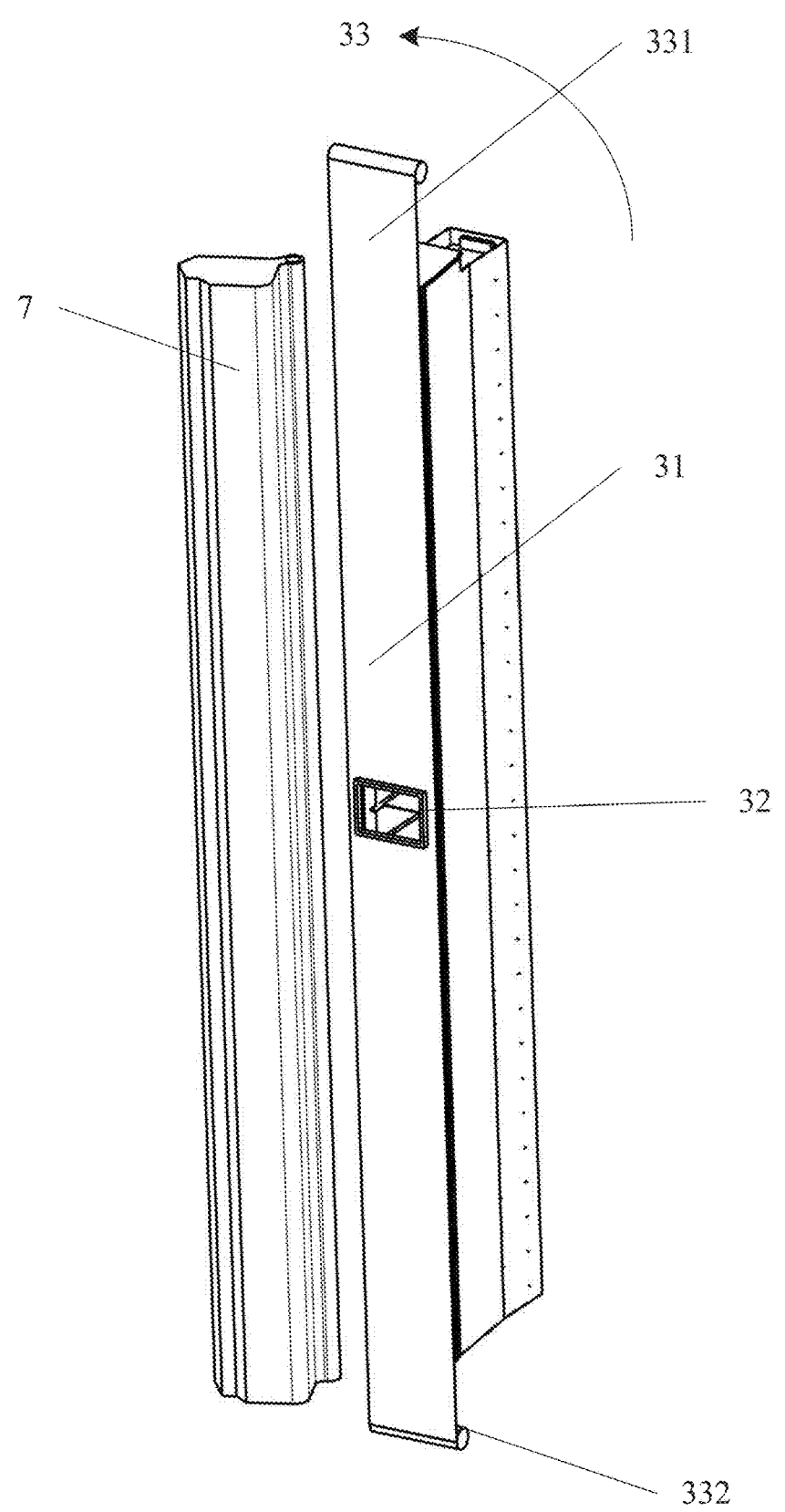
FIG. 5 is a schematic diagram of a roller shutter passage assembly of a vertical low-temperature storage refrigerator.
Figure 6:
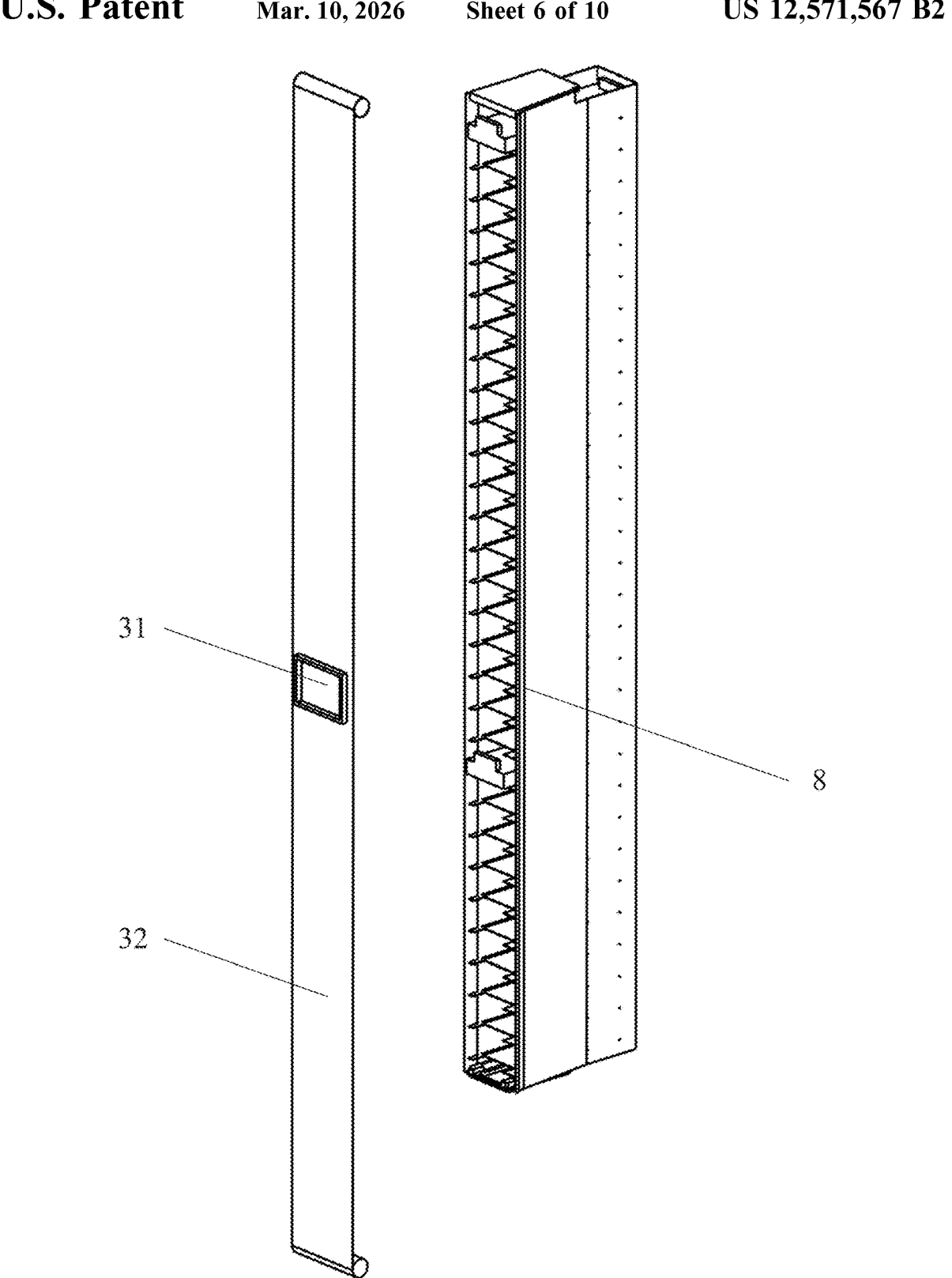
FIG. 6 is a schematic diagram of a basket of a vertical low-temperature storage refrigerator.
Figure 7:
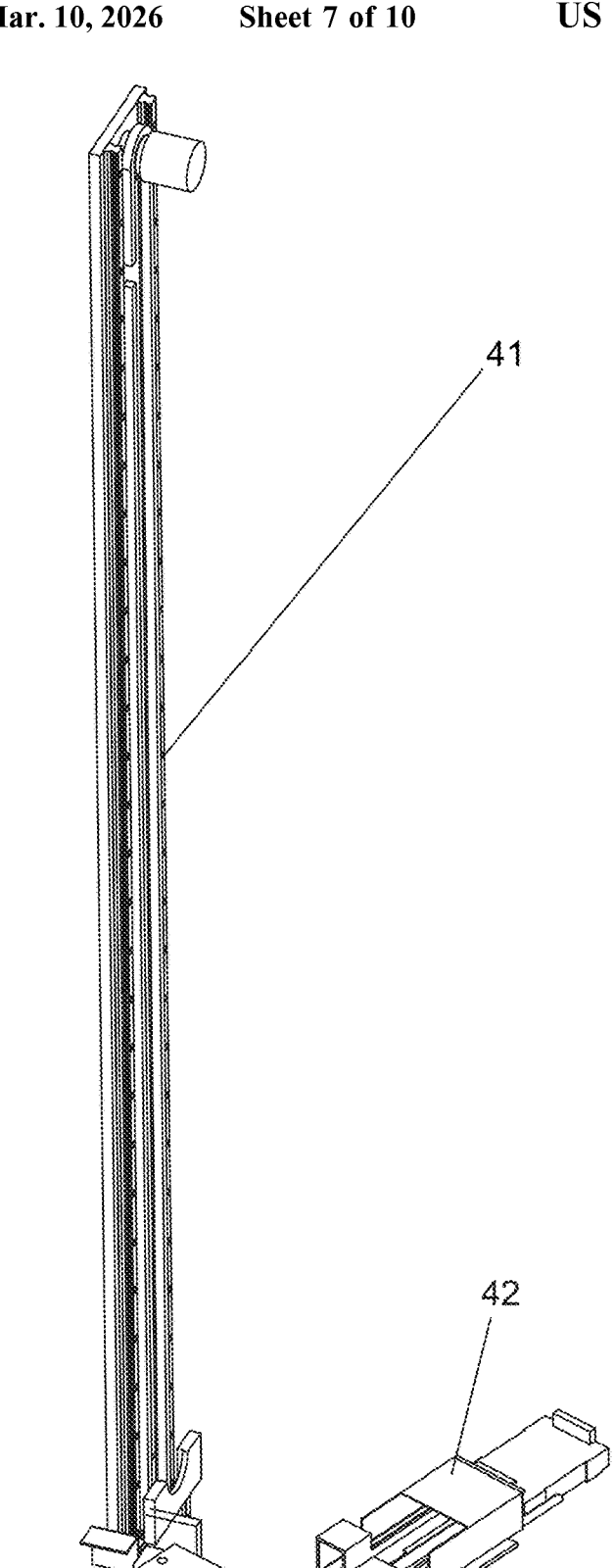
FIG. 7 is an enlarged schematic diagram of a sample scooping mechanism of a vertical low-temperature storage refrigerator.
Figure 8:
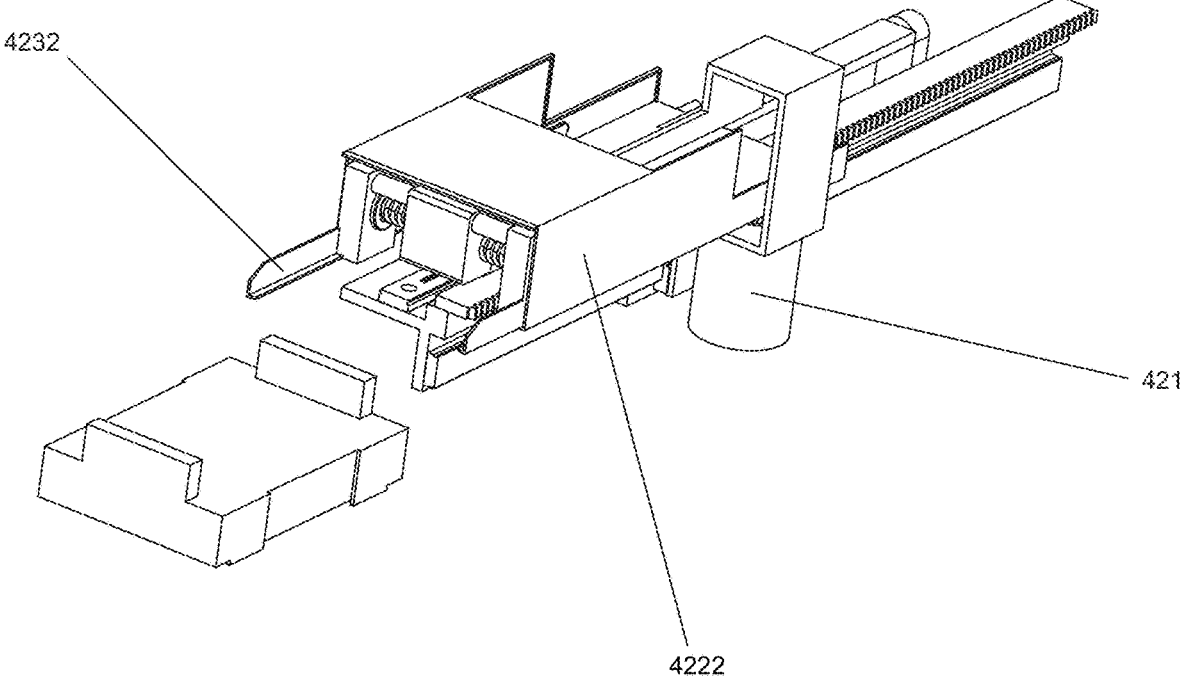
FIG. 8 is an enlarged schematic diagram of a pick-and-place gripper assembly of a vertical low-temperature storage refrigerator.
Figure 9:
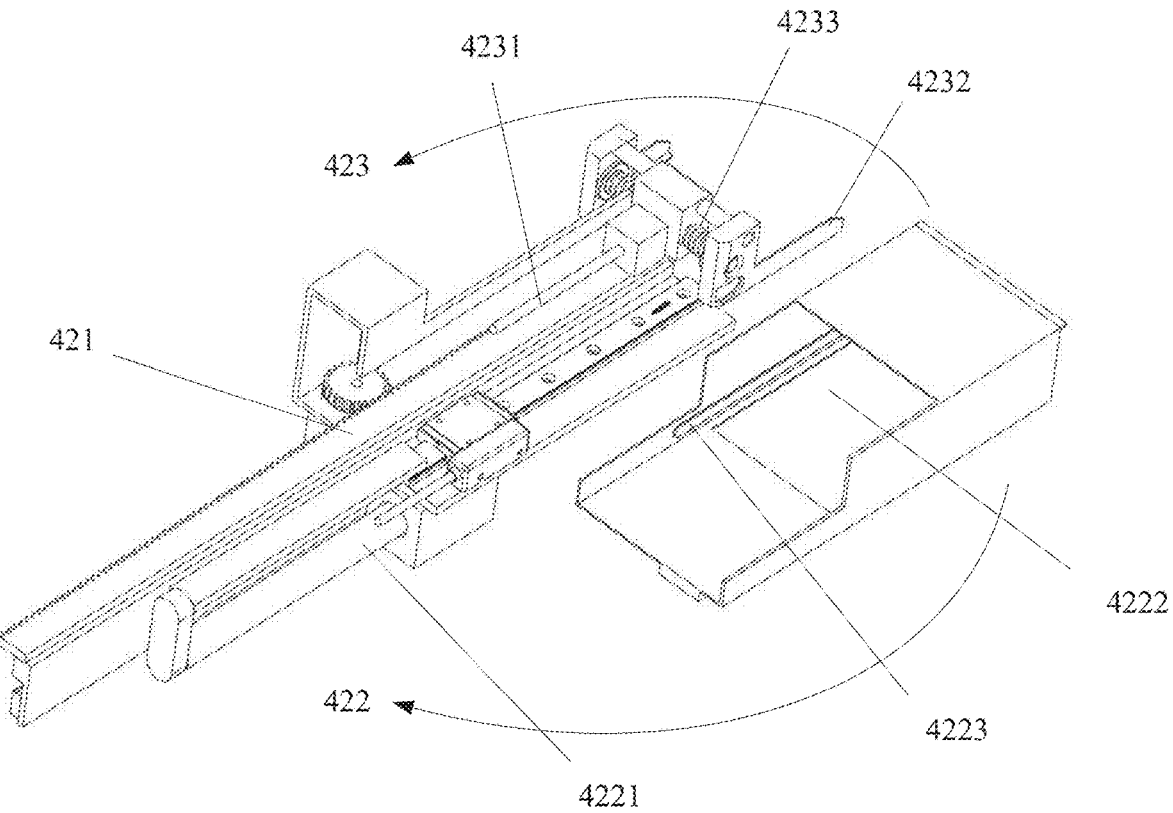
FIG. 9 is an exploded view of a pick-and-place gripper assembly of a vertical low-temperature storage refrigerator.
Figure 10:
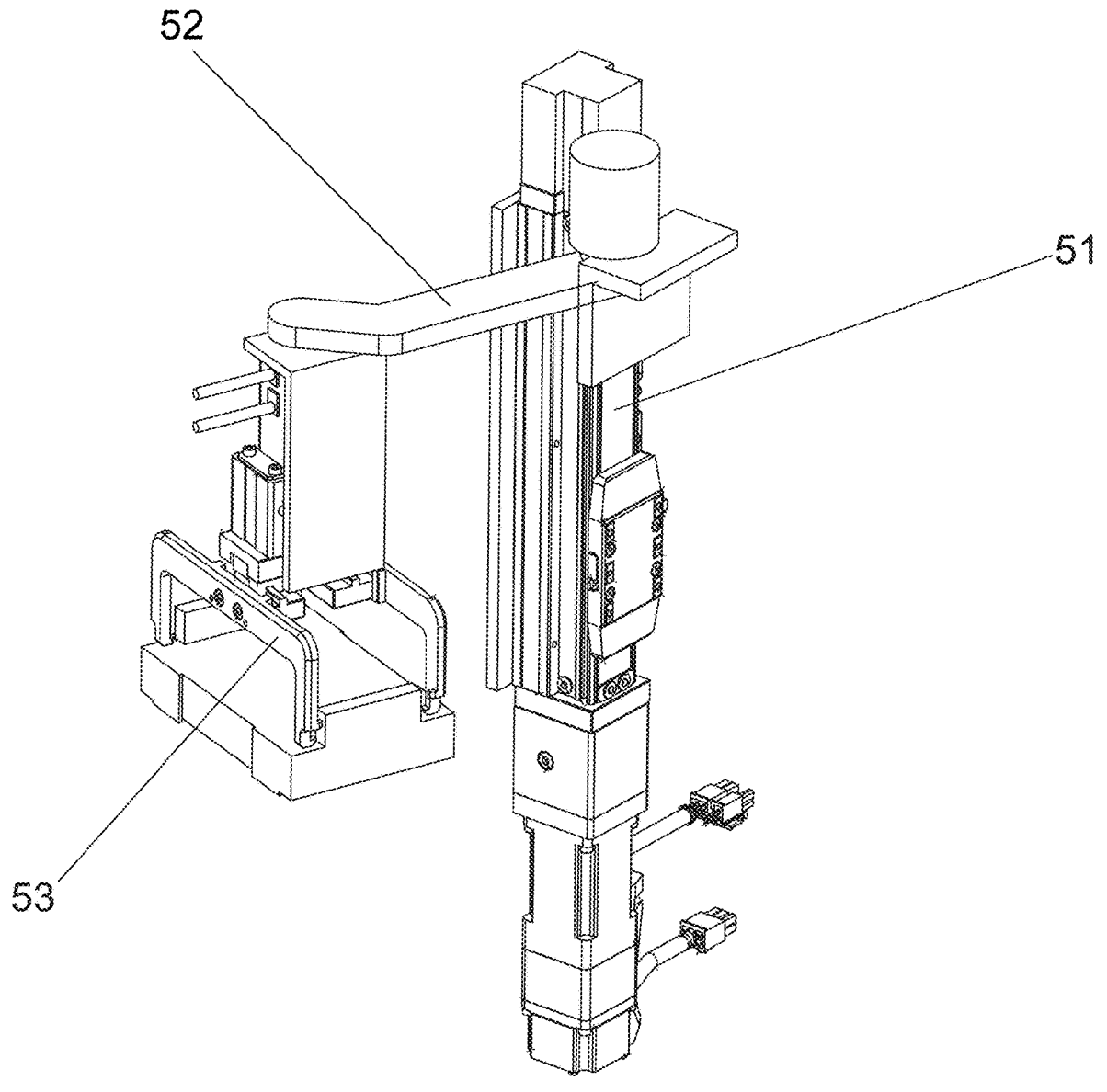
FIG. 10 is a schematic diagram of a grasping mechanism of a vertical low-temperature storage refrigerator.

REFERENCE NUMERALS IN THE FIGURES 1. sample storage chamber; 2. operation chamber; 3. roller shutter passage assembly; 4. sample scooping mechanism; 31. roller shutter; 32. transfer window; 33. rolling storage member; 331. upper roller shaft; 332. lower roller shaft; 5. grasping mechanism; 51. grasping lifting assembly; 52. grasping rotating assembly; 53. gripper member; 991. transfer tank; 992. tank operation door; 6. code scanning mechanism; 41. sample pick-and-place lifting assembly; 42. pick-and-place gripper assembly; 43. steering support member; 421. primary telescopic member; 422. secondary limiting and clamping member; 423. grasping member; 4221. secondary driving member; 4222. support frame; 4223. limiting bar; 4231. pushing member; 4232. scoop plate gripper; 4233. tension-adjusting member; 7. thermal insulation door; 8. basket; 993. observation window; and 994. operation terminal.

DETAILED DESCRIPTIONS OF THE EMBODIMENTS

In order to enable the above objectives, features, and advantages of the present disclosure to be more apparent and easily understood, specific embodiments of the present disclosure will be described in detail below with reference to the accompanying drawings of the specification.

Numerous specific details are set forth in the following description to facilitate a thorough understanding of the present disclosure. However, the present disclosure can be practiced in many other ways than those described herein, and those skilled in the art may make similar improvements without departing from the spirit of the present disclosure, and therefore the present disclosure is not limited by the specific examples disclosed below.

Furthermore, the term "an example" or "example" described herein refers to a specific feature, structure, or characteristic that may be included in at least one embodiment of the present disclosure. The term "in an example" that appears in different places in this specification neither necessarily refers to the same example, nor refers to a separate or selective example that is mutually exclusive with other examples.

Example 1

With reference to FIGS. 1-4, in a first example of the present disclosure, a vertical low-temperature storage refrigerator is provided, including a sample storage chamber 1 and an operation chamber 2, where the sample storage chamber 1 is configured for low-temperature storage of samples, and the operation chamber 2 is configured for storage and retrieval, transfer, and tube picking of the samples in the sample storage chamber 1. A roller shutter passage assembly 3 is arranged on the sample storage chamber 1, and a sample scooping mechanism 4 is configured to scoop and transport the samples in the sample storage chamber 1 through the roller shutter passage assembly 3.

Specifically, the sample storage chamber 1 and the operation chamber 2 are provided; the operation chamber 2 is arranged laterally adjacent to the sample storage chamber 1, and the operation chamber 2 is configured for storage and retrieval, transfer, and tube picking of the samples in the sample storage chamber 1; and the roller shutter passage assembly 3 is arranged on the sample storage chamber 1, and the roller shutter passage assembly 3 is arranged inside the operation chamber 2; and the sample scooping mechanism 4 is arranged inside the operation chamber 2, the roller shutter passage assembly 3 and the sample scooping mechanism 4 may move upward or downward, and the sample scooping mechanism 4 is configured to store and scoop the corresponding samples in the sample storage chamber 1 through the roller shutter passage assembly 3.

Preferably, the roller shutter passage assembly 3 may move upward or downward together with the sample scooping mechanism 4, thereby ensuring that the sample scooping mechanism 4 smoothly stores or scoops the samples through the roller shutter passage assembly 3.

In summary, in the present disclosure, the liftable roller shutter passage assembly 3 is arranged on the sample storage chamber 1, and a target sample is scooped by the liftable sample scooping mechanism 4, while other samples that do not need to be scooped are not exposed, thereby ensuring that internal samples will not lose viability due to temperature variations.

Example 2

With reference to FIGS. 1-10, a second example of the present disclosure is provided. In the previous example, the vertical low-temperature storage refrigerator includes the sample storage chamber 1 and the operation chamber 2, where the sample storage chamber 1 is configured for low-temperature storage of samples, and the operation chamber 2 is configured for storage and retrieval, transfer, and tube picking of the samples in the sample storage chamber 1. The roller shutter passage assembly 3 is arranged on the sample storage chamber 1, and the sample scooping mechanism 4 is configured to scoop and transport the samples in the sample storage chamber 1 through the roller shutter passage assembly 3.

Specifically, the sample storage chamber 1 and the operation chamber 2 are provided; the operation chamber 2 is arranged laterally adjacent to the sample storage chamber 1, and the operation chamber 2 is configured for storage and retrieval, transfer, and tube picking of the samples in the sample storage chamber 1; and the roller shutter passage assembly 3 is arranged on the sample storage chamber 1, and the roller shutter passage assembly 3 is arranged inside the operation chamber 2; and the sample scooping mechanism 4 is arranged inside the operation chamber 2, the roller shutter passage assembly 3 and the sample scooping mechanism 4 may move upward or downward, and the sample scooping mechanism 4 is configured to store and scoop the corresponding samples in the sample storage chamber 1 through the roller shutter passage assembly 3.

Preferably, the roller shutter passage assembly 3 may be lifted and lowered together with the sample scooping mechanism 4, thereby ensuring that the sample scooping mechanism 4 smoothly stores or scoops the samples through the roller shutter passage assembly 3.

Further, the roller shutter passage assembly 3 includes a roller shutter 31 and a transfer window 32 opened on the roller shutter 31; and the roller shutter 31 is configured to drive the transfer window 32 to move upward or downward, and the sample scooping mechanism 4 is configured for storage and retrieval of the samples in the sample storage chamber 1 in a way of penetrating the transfer window 32.

Further, the roller shutter passage assembly 3 further includes a rolling storage member 33, the rolling storage member 33 is arranged on the roller shutter 31, and the rolling storage member 33 is configured to drive the roller shutter 31 to move upward or downward and retract the roller shutter 31.

Preferably, the roller shutter 31 is configured to retract the rolling storage member 33 in a way of moving upward or downward, vertical movement of the roller shutter 31 drives the transfer window 32 to move upward or downward, the transfer window 32 is configured to correspondingly match sample storage slots on each layer of a basket in the sample storage chamber 1, and the sample scooping mechanism 4 penetrates the transfer window 32 to store and retrieve or scoop the samples from the sample storage slots on each layer of the basket.

Preferably, the rolling storage member 33 drives the roller shutter 31 and the sample scooping mechanism 4 to move upward or downward simultaneously.

Preferably, the transfer window 32 is arranged to correspondingly match the sample storage slots on the basket, and other sample storage slots on the basket may be enclosed to reduce unnecessary temperature variations; and frequent storage and retrieval to samples does not adversely affect the samples in the basket.

Further, the rolling storage member 33 includes an upper roller shaft 331 and a lower roller shaft 332; the upper roller shaft 331 is arranged at an upper end of the roller shutter 31, the lower roller shaft 332 is arranged at a lower end of the roller shutter 31, the upper roller shaft 331 is configured to drive the roller shutter 31 to move upward for storage, and the lower roller shaft 332 is configured to drive the roller shutter 31 to move downward for storage.

Further, a grasping mechanism 5 is further arranged inside the operation chamber 2, the grasping mechanism 5 rotatably moves upward or downward to grasp a sample, and the grasping mechanism 5 may be butt-jointed with the sample scooping mechanism 4.

Preferably, the sample scooping mechanism 4 may move upward or downward to a side edge of the grasping mechanism 5 to cooperate with the grasping mechanism 5.

Further, the grasping mechanism 5 includes a grasping lifting assembly 51, a grasping rotating assembly 52, and a gripper member 53; and the grasping rotating assembly 52 is arranged on the grasping lifting assembly 51, the gripper member 53 is arranged on the grasping rotating assembly 52, the grasping lifting assembly 51 is configured to drive the grasping rotating assembly 52 to move upward or downward, the grasping rotating assembly 52 is configured to drive the gripper member 53 to rotate, and the gripper member 53 is configured to grasp the sample.

Further, a transfer tank retention zone is arranged at a side end of the grasping mechanism 5, a transfer tank 991 may be placed inside the transfer tank retention zone, and the grasping mechanism 5 is configured to grasp the samples in the transfer tank 991.

Further, a tank passage is opened on the operation chamber 2, the tank passage is arranged on one side of the transfer tank retention zone, a tank operation door 992 is arranged inside the tank passage, and the transfer tank 991 enters the transfer tank retention zone through the tank passage.

Preferably, the transfer tank 991 may be placed inside the transfer tank retention zone by opening the tank operation door 992, and the grasping mechanism 5 is configured to grasp the sample or place the grasped sample inside the transfer tank 991.

Further, a code scanning mechanism 6 is further arranged laterally adjacent to the grasping mechanism 5, and the grasping mechanism 5 is configured to grasp the sample and rotate same onto the code scanning mechanism 6 for code scanning.

Preferably, the code scanning mechanism 6 and the transfer tank retention zone are circumferentially arranged around the grasping mechanism 5, and the sample scooping mechanism 4 may move upward or downward to one side of the grasping mechanism 5; and the grasping mechanism 5 is capable of realizing the free movement of the above three functional areas, without the need to arrange an additional grasping mechanism 5, thereby saving costs.

Further, the sample scooping mechanism 4 includes a sample pick-and-place lifting assembly 41, a pick-and-place gripper assembly 42, and a steering support member 43, where the steering support member 43 is arranged on the sample pick-and-place lifting assembly 41, the pick-and-place gripper assembly 42 is arranged on the steering support member 43, the steering support member 43 may slide vertically on the sample pick-and-place lifting assembly 41, the steering support member 43 turns around the sample pick-and-place lifting assembly 41, and the pick-and-place gripper assembly 42 is configured to grasp and store the sample at a target position.

Preferably, at least one steering support member 43 is arranged, the pick-and-place gripper assembly 42 is configured to telescopically grasp the sample, and the pick-and-place gripper assembly 42 is configured to telescopically scoop a sample/biological plate rack in the sample storage chamber 1 through the transfer window 32; and alternatively, the sample/biological plate rack is placed inside the sample storage chamber 1.

Preferably, the sample pick-and-place lifting assembly 41 is configured to drive the steering support member 43 and the pick-and-place gripper assembly 42 to move upward or downward, and the steering support member 43 is configured to drive the pick-and-place gripper assembly 42 to change direction.

Further, the pick-and-place gripper assembly 42 includes a primary telescopic member 421, a secondary limiting and clamping member 422, and a grasping member 423, where the secondary limiting and clamping member 422 is arranged on the primary telescopic member 421, the grasping member 423 is arranged on the secondary limiting and clamping member 422, the grasping member 423 is configured to scoop the sample, the primary telescopic member 421 is configured to drive the secondary limiting and clamping member 422 and the grasping member 423 to perform telescopic movement, the secondary limiting and clamping member 422 is configured to perform secondary telescopic movement on the primary telescopic member 421, and the grasping member 423 is configured to perform telescopic movement on the secondary limiting and clamping member 422.

Preferably, the primary telescopic member 421 includes a mounting base, a motor, a gear, and a movable rack plate, where the motor and the gear are arranged on the mounting base, the movable rack plate is slidable on the mounting base, the motor drives the gear to rotate, the gear drives the movable rack plate to move forward or backward, the movable rack plate is connected to the secondary limiting and clamping member 422, and when the movable rack plate moves, the secondary limiting and clamping member 422 is driven to move forward or backward.

Preferably, through movement of the primary telescopic member 421 and the secondary limiting and clamping member 422, the sample or the sample plate rack is effectively scooped by the grasping member 423.

Further, the secondary limiting and clamping member 422 includes a secondary driving member 4221, a support frame 4222, and a limiting bar 4223, where the secondary driving member 4221 is configured to drive the support frame 4222 to move on the primary telescopic member 421, and the limiting bar 4223 is arranged on an inner side of the support frame 4222, and the limiting bar 4223 is configured to press against the grasping member 423.

Preferably, the secondary driving member 4221 may be composed of a magnetic motor, a slide rail, and a sliding block; and alternatively, the secondary driving member 4221 is a driving mechanism in the prior art as long as the driving function is achieved.

Further, the grasping member 423 includes a pushing member 4231, a scoop plate gripper 4232, and a tension-adjusting member 4233, where the tension-adjusting member 4233 is arranged on an inner side of the scoop plate gripper 4232, the pushing member 4231 is connected to the tension-adjusting member 4233, the limiting bar 4223 is configured to press against and limit the tension-adjusting member 4233 on the scoop plate gripper 4232, and the pushing member 4231 is configured to push the tension-adjusting member 4233 and the scoop plate gripper 4232 to disengage from the limiting bar 4223 so as to avoid being pressed and limited.

Preferably, the tension-adjusting member 4233 may be a spring, and the limiting bar 4223 inside the support frame 4222 is configured to press against the scoop plate gripper 4232, such that two scoop plate grippers 4232 move toward a center therebetween, thereby pressing against the plate rack or sample through the scoop plate grippers 4232.

Preferably, the pushing member 4231 is a hollow shaft motor and is configured to push the scoop plate gripper 4232 to disengage from the limiting bar 4223 on the support frame 4222, such that the tension-adjusting member 4233 is disengaged from the limiting bar 4223 to avoid being pressed, and the tension-adjusting member 4233 drives the two scoop plate grippers 4232 to expand outward, thereby releasing a clamped limiting state and facilitating the placement of the plate rack or sample to a specific position.

Preferably, the pushing member 4231 is configured to push the scoop plate gripper 4232 into the support frame 4222, and the limiting bar 4223 is configured to press against the tension-adjusting member 4233, such that the sample is clamped; and alternatively, the secondary driving member 4221 is configured to drive the support frame 4222 to clamp the scoop plate gripper 4232, depending on conditions inside the chamber.

Further, a thermal insulation door 7 is arranged inside the operation chamber 2, and the thermal insulation door 7 is configured to open and close the roller shutter passage assembly 3.

Preferably, when sample storage and retrieval is not required, the roller shutter passage assembly 3 is closed by the thermal insulation door 7, to further insulate the sample storage chamber 1.

Further, a basket 8 is arranged inside the sample storage chamber 1, and the transfer window 32 moves upward or downward to correspondingly match the storage slots on the basket 8.

Preferably, the 360-degree rotatable basket 8 may be arranged inside the sample storage chamber 1.

Preferably, a plurality of sample storage slots are vertically arranged on the basket 8, and the sample or sample plate rack is stored in each of the storage slots.

Further, an observation window 993 and an operation terminal 994 are arranged on the operation chamber 2, where the observation window 993 is configured to observe an internal operating state of the operation chamber 2, and the operation terminal 994 is configured to issue commands and display an internal state of the sample storage chamber 1.

In summary, in the present disclosure, the rolling storage member 33 drives the transfer window 32 to move upward or downward, so as to match the corresponding storage slot on the basket in the sample storage chamber 1, and the sample scooping mechanism 4 penetrates the transfer window 32 by moving upward or downward to scoop the sample on the basket, which avoids exposure of other samples that do not need to be extracted, and reduces the adverse effects on the samples in the sample storage chamber 1; the grasping mechanism 5, the transfer tank retention zone and the code scanning mechanism 6 are arranged together, and the sample scooping mechanism 4 may move upward or downward to a side of the grasping mechanism 5, such that the grasping mechanism 5 facilitates sample grasping, transport and scanning, and only one grasping mechanism 5 is needed to realize the free movement of a plurality of functional areas; the thermal insulation door 7 is configured to close the roller shutter passage assembly 3, so as to further insulate the sample storage chamber 1; and the sample scooping mechanism 4 is configured to achieve sample storage and retrieval, and it is ensured that the sample does not fall off during the scooping and transport process, and after being transported to a specific position, the sample or plate rack is pushed out and placed.

Importantly, it should be noted that the construction and arrangement of the present disclosure shown in a plurality of different exemplary embodiments are only illustrative. Although only a few embodiments are described in detail in the disclosed content, those who refer to the disclosed content should readily understood that many modifications can be made (e.g., variations in dimensions, scales, structures, shapes and proportions of various elements, parameters (e.g., temperature, pressure, and the like), installation arrangement, material selections, colors, orientations, and the like) without substantially departing from the novel teachings and advantages of the subject matter described in the present disclosure. For example, the element shown as integrally formed may be composed of a plurality of parts or elements, the position of the element may be inverted or otherwise changed, and the nature, number, or position of the discrete element may be modified or varied. Therefore, all such modifications are intended to be included in the scope of the present disclosure. The order or sequence of any process or method steps may be altered or rearranged according to an alternative embodiment. In the claims, any "means-plus-function" clause is intended to cover the structure of performing the function described herein, including not only structurally equivalents but also equivalent structures. Without departing from the scope of the present disclosure, other substitutions, modifications, changes, and omissions may be made in the design, operation, and arrangement of the exemplary embodiments. Therefore, the present disclosure is not limited to particular embodiments but extends to various modifications still falling within the scope of the appended claims.

Additionally, in order to provide a concise description of exemplary embodiments, not all features of an actual embodiment (i.e., those features unrelated to the best mode presently contemplated for carrying out the present disclosure or those features unrelated to implementing of the present disclosure) must be described.

It should be understood that in the development of any actual embodiment, numerous implementation-specific decisions may be made in any engineering or design project. Such development efforts may be complex and time-consuming, but for those skilled in the art benefiting from the disclosed content, such efforts will be routine design, manufacturing, and production without excessive experimentation.

It should be noted that the above embodiments are merely intended for describing the technical solutions of the present disclosure rather than limiting same. Although the present disclosure is described in detail with reference to the above embodiments, persons of ordinary skill in the art should understand that they may still make modifications or equivalent replacements to the technical solutions of the present disclosure without departing from the spirit and scope of the technical solutions of the present disclosure, which shall fall within the scope of the claims of the present disclosure.

What is claimed is:

1. A vertical low-temperature storage refrigerator, comprising a sample storage chamber and an operation chamber, wherein the operation chamber is arranged laterally adjacent to the sample storage chamber, and the operation chamber is configured for storage and retrieval, transfer, and tube picking of samples in the sample storage chamber; and a roller shutter passage assembly is arranged on the sample storage chamber, and the roller shutter passage assembly is arranged inside the operation chamber; and a sample scooping mechanism is arranged inside the operation chamber, the roller shutter passage assembly and the sample scooping mechanism are allowed to move upward or downward, and the sample scooping mechanism is configured to store and scoop samples in the sample storage chamber through the roller shutter passage assembly;

wherein the roller shutter passage assembly comprises a roller shutter and a transfer window opened on the roller shutter; and the roller shutter is configured to drive the transfer window to move upward or downward, and the sample scooping mechanism is configured for storage and retrieval of the samples in the sample storage chamber in a way of penetrating the transfer window.

2. The vertical low-temperature storage refrigerator according to claim 1, wherein a basket is arranged inside the sample storage chamber, and the transfer window moves upward or downward to correspondingly match a storage slot on the basket.

3. The vertical low-temperature storage refrigerator according to claim 1, wherein an observation window and an operation terminal are arranged on the operation chamber, the observation window is configured to observe an internal operating state of the operation chamber, and the operation terminal is configured to issue commands and display an internal state of the sample storage chamber.

4. The vertical low-temperature storage refrigerator according to claim 1, wherein the roller shutter passage assembly further comprises a rolling storage member, the rolling storage member is arranged on the roller shutter, and the rolling storage member is configured to drive the roller shutter to move upward or downward and retract the roller shutter.

5. The vertical low-temperature storage refrigerator according to claim 4, wherein the rolling storage member comprises an upper roller shaft and a lower roller shaft, the upper roller shaft is arranged at an upper end of the roller shutter, the lower roller shaft is arranged at a lower end of the roller shutter, the upper roller shaft is configured to drive the roller shutter to move upward for storage, and the lower roller shaft is configured to drive the roller shutter to move downward for storage.

6. The vertical low-temperature storage refrigerator according to claim 1, wherein the sample scooping mechanism comprises a sample pick-and-place lifting assembly, a pick-and-place gripper assembly, and a steering support member, wherein the steering support member is arranged on the sample pick-and-place lifting assembly, the pick-and-place gripper assembly is arranged on the steering support member, the steering support member slides vertically on the sample pick-and-place lifting assembly, the steering support member turns around the sample pick-and-place lifting assembly, and the pick-and-place gripper assembly is configured to grasp and store the sample at a target position.

7. The vertical low-temperature storage refrigerator according to claim 6, wherein the pick-and-place gripper assembly comprises a primary telescopic member, a secondary limiting and clamping member, and a grasping member, wherein the secondary limiting and clamping member is arranged on the primary telescopic member, the grasping member is arranged on the secondary limiting and clamping member, the grasping member is configured to scoop the sample, the primary telescopic member is configured to drive the secondary limiting and clamping member and the grasping member to perform telescopic movement, the secondary limiting and clamping member is configured to perform secondary telescopic movement on the primary telescopic member, and the grasping member is configured to perform telescopic movement on the secondary limiting and clamping member.

8. The vertical low-temperature storage refrigerator according to claim 7, wherein the secondary limiting and clamping member comprises a secondary driving member, a support frame, and a limiting bar, wherein the secondary driving member is configured to drive the support frame to move on the primary telescopic member, and the limiting bar is arranged on an inner side of the support frame, and the limiting bar is configured to press against the grasping member.

9. The vertical low-temperature storage refrigerator according to claim 8, wherein the grasping member comprises a pushing member, a scoop plate gripper, and a tension-adjusting member, wherein the tension-adjusting member is arranged on an inner side of the scoop plate gripper, the pushing member is connected to the tension-adjusting member, the limiting bar is configured to press against and limit the tension-adjusting member on the scoop plate gripper, and the pushing member is configured to push the tension-adjusting member and the scoop plate gripper to disengage from the limiting bar to avoid being pressed and limited.

10. A vertical low-temperature storage refrigerator, comprising a sample storage chamber and an operation chamber, wherein the operation chamber is arranged laterally adjacent to the sample storage chamber, and the operation chamber is configured for storage and retrieval, transfer, and tube picking of samples in the sample storage chamber;

a roller shutter passage assembly is arranged on the sample storage chamber, and the roller shutter passage assembly is arranged inside the operation chamber; and a sample scooping mechanism is arranged inside the operation chamber, the roller shutter passage assembly and the sample scooping mechanism are allowed to move upward or downward, and the sample scooping mechanism is configured to store and scoop samples in the sample storage chamber through the roller shutter passage assembly; and a grasping mechanism is further arranged inside the operation chamber, the grasping mechanism rotatably moves upward or downward to grasp a sample, and the grasping mechanism is configured to be butt-jointed with the sample scooping mechanism.

11. The vertical low-temperature storage refrigerator according to claim 10, wherein the grasping mechanism comprises a grasping lifting assembly, a grasping rotating assembly, and a gripper member; and the grasping rotating assembly is arranged on the grasping lifting assembly, the gripper member is arranged on the grasping rotating assembly, the grasping lifting assembly is configured to drive the grasping rotating assembly to move upward or downward, the grasping rotating assembly is configured to drive the gripper member to rotate, and the gripper member is configured to grasp the sample.

12. The vertical low-temperature storage refrigerator according to claim 10, wherein a transfer tank retention zone is arranged at a side end of the grasping mechanism, a transfer tank is placed inside the transfer tank retention zone, and the grasping mechanism is configured to grasp the samples in the transfer tank.

13. The vertical low-temperature storage refrigerator according to claim 12, wherein a tank passage is opened on the operation chamber, the tank passage is arranged on one side of the transfer tank retention zone, a tank operation door is arranged inside the tank passage, and the transfer tank enters the transfer tank retention zone through the tank passage.

14. The vertical low-temperature storage refrigerator according to claim 10, wherein a code scanning mechanism is further arranged laterally adjacent to the grasping mechanism, and the grasping mechanism is configured to grasp the sample and rotate same onto the code scanning mechanism for code scanning.

15. A vertical low-temperature storage refrigerator, comprising a sample storage chamber and an operation chamber, wherein the operation chamber is arranged laterally adjacent to the sample storage chamber, and the operation chamber is configured for storage and retrieval, transfer, and tube picking of samples in the sample storage chamber;

a roller shutter passage assembly is arranged on the sample storage chamber, and the roller shutter passage assembly is arranged inside the operation chamber; and a sample scooping mechanism is arranged inside the operation chamber, the roller shutter passage assembly and the sample scooping mechanism are allowed to move upward or downward, and the sample scooping mechanism is configured to store and scoop samples in the sample storage chamber through the roller shutter passage assembly; and a thermal insulation door is arranged inside the operation chamber, and the thermal insulation door is configured to open and close the roller shutter passage assembly.

* * * * *